United States Patent [19]
Stoddard

[11] Patent Number: 5,606,900
[45] Date of Patent: Mar. 4, 1997

[54] VARIABLE HEIGHT, HIGH PERFORMANCE, BANDSAW BLADE AND METHOD OF MANUFACTURE THEREFOR

[75] Inventor: Ralph Stoddard, Athol, Mass.

[73] Assignee: The L.S. Starrett Company, Athol, Mass.

[21] Appl. No.: 286,384

[22] Filed: Aug. 4, 1994

Related U.S. Application Data

[63] Continuation of Ser. No. 109,325, Aug. 19, 1993, abandoned, which is a continuation-in-part of Ser. No. 881,182, May 11, 1992, abandoned.

[51] Int. Cl.⁶ .......................... B23D 61/12; B27B 33/02
[52] U.S. Cl. ................ 83/846; 83/851; 83/852; 76/112
[58] Field of Search ............... 83/835, 846, 851, 83/852, 848, 849, 661; 76/112

[56] References Cited

U.S. PATENT DOCUMENTS

| | | | |
|---|---|---|---|
| 10,932 | 5/1854 | Stewart | 83/846 |
| 1,470,871 | 10/1923 | Osterdahl et al. | 83/849 |
| 3,005,478 | 10/1961 | Laviano | 83/846 |
| 4,179,967 | 12/1979 | Clark | 83/846 |
| 4,727,788 | 3/1988 | Yoshida et al. | 83/851 X |

FOREIGN PATENT DOCUMENTS

| | | | |
|---|---|---|---|
| 294139 | 5/1929 | United Kingdom | 83/852 |

*Primary Examiner*—Eugenia Jones
*Attorney, Agent, or Firm*—Fish & Richardson P.C.

[57] ABSTRACT

A high performance, moderate cost bandsaw blade has a unique tooth configuration which enables it to provide high performance, while using standard manufacturing processes and available bandsaw equipment. The bandsaw blade has a straight back edge and a repeating tooth pattern wherein each set tooth, of each repeating tooth pattern has a set which is a monotonically increasing function of the height of the tooth. The height of each tooth in the repeating tooth pattern increases from the first tooth of the pattern to the last tooth of the pattern. The height difference between the beginning and end of a tooth pattern is preferably on the order of ten to twenty-five thousandths of an inch, more preferably between fifteen and twenty thousandths of an inch, and the length of a repeating pattern is typically about six inches to match a standard cutter.

11 Claims, 2 Drawing Sheets

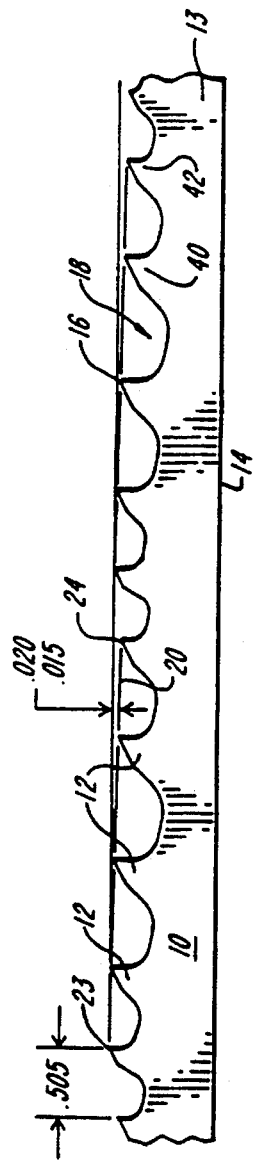
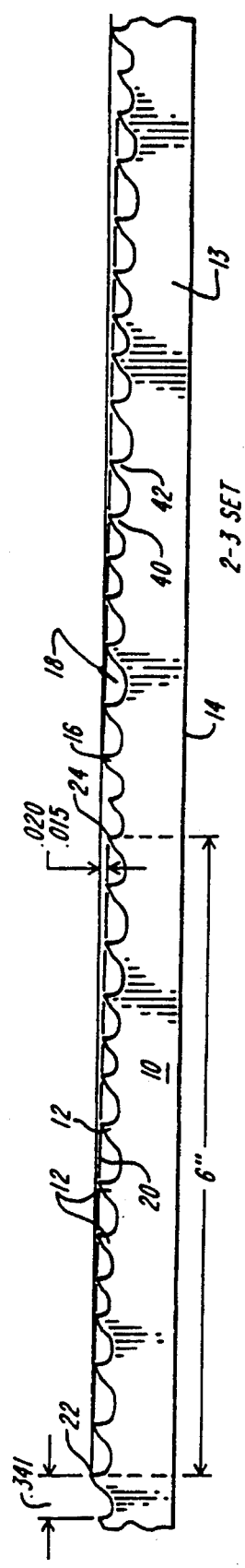
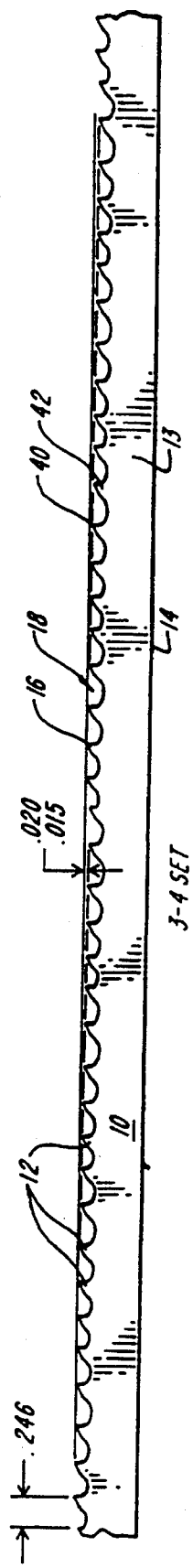

1-2 SET 2-3 SET 3-4 SET

VARIABLE HEIGHT, HIGH PERFORMANCE, BANDSAW BLADE AND METHOD OF MANUFACTURE THEREFOR

This is a continuation of application Ser. No. 08/109,325, filed Aug. 19, 1993, now abandoned, which is a continuation-in-part of application Ser. No. 07/881,182, filed May 11, 1992, now abandoned.

BACKGROUND OF THE INVENTION

The invention relates generally to high performance bandsaw blades and in particular, to those bandsaw blades which have variable height, pitch, and set.

A typical measure of bandsaw blade performance is the throughput in comparison to the price paid for the blade and/or the equipment needed for running it. Over the past two decades, many different approaches to high performance bandsaw blades, for example blades used in cutting stainless steel and the like, have been developed. One particular method employs a cammed back edge which provides a "surging" of the blade during cutting. The back edge in effect causes the blade to move relative to and into the metal being cut. Another approach provides for "surging" of the blade as the back edge of the blade varies to provide an undulating surface which causes the blade to oscillate about an imaginary pivot point centered between the rollers pressing on and guiding the back edge.

While these methods represent advances over blades used decades ago, they typically require either major readjustment of the bandsaw blade equipment, the use of entirely new equipment since the older equipment is not adaptable to the new blades, major and substantial additional costs in manufacturing the blades (the cost being absorbed as the performance of the blade increases), or blades which are highly specialized and are accordingly expensive to operate and use.

It is therefore an object of this invention to provide a high performance bandsaw blade operable with present equipment and manufactured using standard and available equipment, yet providing a performance price benefit which is comparable to or surpasses the surging blades previously described. Other objects of the invention are a high performance bandsaw blade which can be manufactured using existing equipment, and which has relatively low or no additional costs associated with the manufacturing process wherein the blade is used. Yet further objects of the invention are a reliable, simple to operate, simple to use, high performance, high speed bandsaw blade.

SUMMARY OF THE INVENTION

The invention relates to a bandsaw blade which features a straight back edge and a repeating tooth pattern. Each set tooth of each repeating tooth pattern has a set which is monotonically related to the height of the tooth. Each tooth of each repeating tooth pattern has a tooth height in which a tooth at the beginning of the pattern has a height which is less than the height of a tooth at the end of the pattern by between, preferably ten and twenty-five thousandths of an inch, more preferably between fifteen and twenty thousandths of an inch, and in one illustrated embodiment, about twenty thousandths of an inch.

In various embodiments of the invention, the repeating tooth pattern can be between four and twelve inches in length, and preferably is about six inches in length. This matches the typical length of a present day cutter used for manufacturing bandsaw blades. The bandsaw blade further has a tooth height which preferably increases linearly over the repeating pattern. In another aspect of the invention, the bandsaw blade teeth have a repeating, specified, set pattern which includes a raker tooth followed by a predetermined number of set teeth. The direction of set of the set teeth alternates in sequence along the blade. The teeth also can have, according to a preferred embodiment of the invention, a variable pitch. Typically, the tooth gullet depth is approximately between 35–48% of tooth pitch.

The method of the invention for manufacturing a bandsaw blade features the steps of cutting repeating patterns of teeth, the height of the tooth at the beginning of the pattern being less than the height of the tooth at the end of the pattern, and setting selected ones of the teeth, the set being a monotonically increasing function of the tooth height. The difference in height from beginning to end of each repeating pattern is between about ten and twenty-five thousandths of an inch, preferably between fifteen and twenty thousandths of an inch, and more preferably, is about twenty thousandths of an inch.

BRIEF DESCRIPTION OF THE DRAWINGS

Other objects, features and advantages of the invention will be apparent from the following description taken together with the drawings in which:

FIGS. 1A, 1B, and 1C are elevation views of a section of a bandsaw blade manufactured in accordance with a preferred embodiment of the invention.

DESCRIPTION OF PREFERRED EMBODIMENTS

Figure 2A:
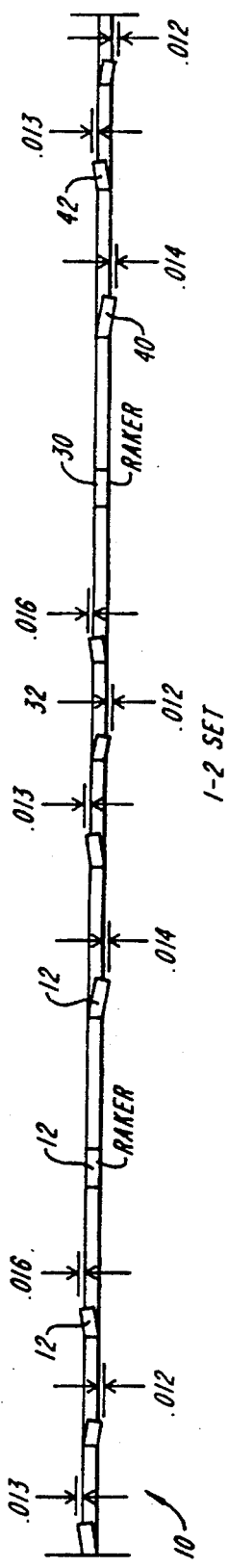
FIGS. 2A, 2B and 2C are top views of the bandsaw blades of FIGS. 1A, 1B and 1C, respective, in accordance with a preferred embodiment of the invention.

Referring to FIGS. 1A, 1B and 1C, a typical bandsaw blade 10, in accordance with the illustrated embodiment of the invention, has a plurality of teeth 12 in a body 13 having a straight back edge 14. The teeth 12 comprises a tip section 16 and a gullet section 18. In accordance with a preferred embodiment of the invention, the points of the teeth tips lie along an inclined imaginary plane 20 which extends from the beginning 24 to the end 22 of a repeating pattern of teeth. According to the invention, the height difference of the teeth over the length of each repeating pattern is between about ten and twenty-five thousandths of an inch, preferably between fifteen and twenty thousandths of an inch, and is most preferably about twenty thousandths of an inch. The teeth in each repeating pattern accordingly increase monotonically in height, in accordance with this illustrated embodiment of the invention, from the beginning of the pattern to the end of the pattern. In other embodiments of the invention, the change in height between the ends of the pattern may not be monotonically increasing. In this illustrated embodiment, a variable pitch blade is described so that the distance between teeth tips varies. The gullet depth between teeth is a function of the pitch and is preferably between 35 and 48% of pitch.

Figure 2B:
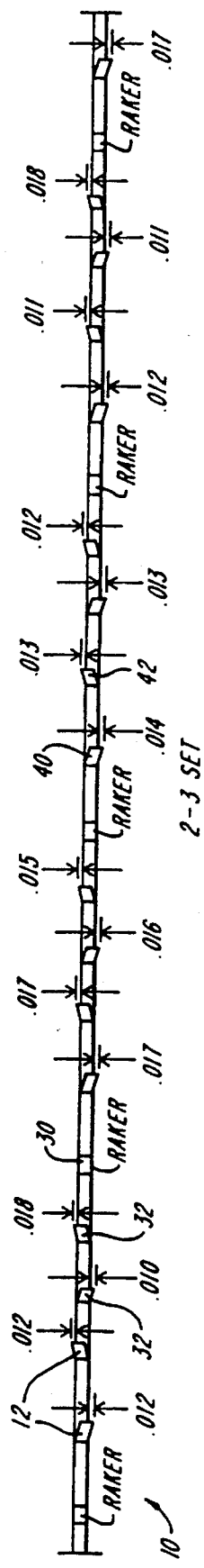
Figure 2C:
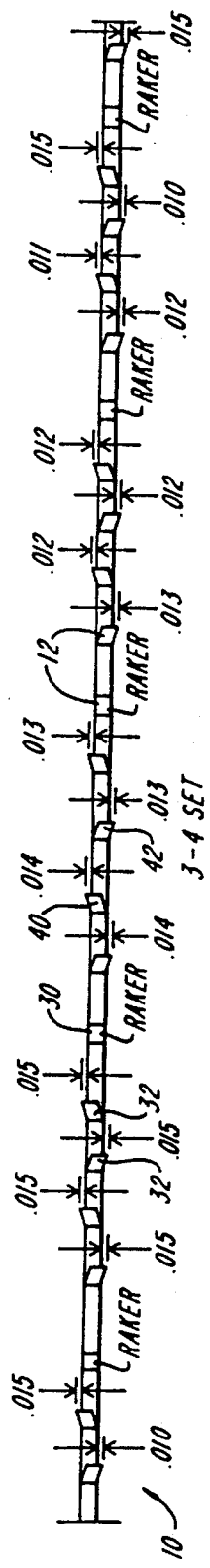

Referring to FIGS. 2A, 2B, and 2C, the set of the teeth is determined by a repeating set pattern which is typically, due to manufacturing constraints, synchronous with the repeating tooth pattern; and can, for example, include multiple occurrences of a raker tooth 30 followed by alternately right and left set teeth 32. In accordance with the illustrated embodiment of the invention, the set of a tooth increases with increasing height. Accordingly, the set of a tooth such as tooth 40 is greater than the set of a tooth such as tooth 42.

In accordance with the illustrated embodiment of the invention, various set patterns and pitch variations can be employed. The overall length of a typical tooth pattern is 6 inches. Thus, in the preferred and illustrated embodiment of the invention, there is provided a 20 thousandths of an inch change in tooth height over a length of about 6 inches.

The manufacture of the bandsaw blades illustrated in FIGS. 1A, 1B, 1C, 2A, 2B and 2C is performed using a standard bandsaw manufacturing process. The cutters are adjusted and positioned to enable the selected repeating tooth pattern, as described above, to be created. The teeth are then set in a standard fashion, and the set of a tooth will automatically be a monotonically increasing function of the tooth height. Accordingly, the manufacturing process closely resembles the standard process for making a bandsaw blade.

Additions, deletions, and other modifications of the preferred and illustrated embodiments of the invention will be apparent to those practiced in the art and are within the scope of the following claims.

What is claimed is:

1. A bandsaw blade having a tooth pattern having a plurality of set cutting teeth, each set tooth having a set greater than or equal to a set of a preceding set tooth, said set at the end of the tooth pattern being greater than the set at the beginning of the tooth pattern, each set tooth having a height with respect to a back edge of said blade greater than a height of a preceding set tooth such that the tips of said set teeth lie in a plane which is inclined with respect to the back edge of said blade, said tooth height at the end of the tooth pattern being between about ten and twenty-five thousandths of an inch greater than the tooth height at the beginning of the tooth pattern, said tooth pattern being repeated along said blade such that the tooth height at the end of a respective tooth pattern is greater than the tooth height at the beginning of a subsequent tooth pattern.

2. The bandsaw blade of claim 1 wherein said repeating tooth pattern is between four and twelve inches in length.

3. The bandsaw blade of claim 2 wherein said repeating tooth pattern is about six inches in length.

4. The bandsaw blade of claim 1 wherein said teeth have a repeating specified set pattern comprising a raker tooth followed by a predetermined number of set teeth, the set alternating in sequence along said teeth of the set pattern.

5. The bandsaw blade of claim 1 wherein said teeth have a variable pitch.

6. The bandsaw blade of claim 5 wherein said teeth have a gullet depth of between about 35% and 48% of tooth pitch.

7. A bandsaw blade having a tooth pattern having a plurality of set cutting teeth, each set tooth having a set greater than or equal to a set of a preceding set tooth, said set at the end of the tooth pattern being greater than the set at the beginning of the tooth pattern, each set tooth having a height with respect to a back edge of said blade greater than a height of a preceding set tooth such that the tips of said set teeth lie in a plane which is inclined with respect to the back edge of said blade, said tooth height at the end of the tooth pattern being between about fifteen and twenty thousandths of an inch greater than the tooth height at the beginning of the tooth pattern, said tooth pattern being repeated along said blade such that the tooth height at the end of a respective tooth pattern is greater than the tooth height at the beginning of a subsequent tooth pattern.

8. A bandsaw blade having a tooth pattern having a plurality of set cutting teeth, each set tooth of said tooth pattern having a set which increases with the height of the tooth, the set teeth of said tooth pattern having a tooth height which increases linearly over the tooth pattern, the tooth height at the end of the tooth pattern being between about ten and twenty-five thousandths of an inch greater than the tooth height at the beginning of the tooth pattern, said tooth pattern including a raker tooth followed by a predetermined number of set teeth, the set alternating in sequence along the teeth of the tooth pattern, and the teeth having a variable pitch, and tips of said set teeth lying in a plane which is inclined with respect to a back edge of said blade, said tooth pattern being repeated along said blade such that the tooth height at the end of a respective tooth pattern is greater than the tooth height at the beginning of a subsequent tooth pattern, each repeating tooth pattern having a length of about 6 inches.

9. A bandsaw blade having a tooth pattern having a plurality of set cutting teeth, each set tooth of said tooth pattern having a set which increases with the height of the tooth, the set teeth of said tooth pattern having a tooth height which increases linearly over the tooth pattern, the tooth height at the end of the tooth pattern being between about fifteen and twenty thousandths of an inch greater than the tooth height at the beginning of the tooth pattern, said tooth pattern including a raker tooth followed by a predetermined number of set teeth, the set alternating in sequence along the teeth of the tooth pattern, and the teeth having a variable pitch, and tips of said set teeth lying in a plane which is inclined with respect to a back edge of said blade, said tooth pattern being repeated along said blade such that the tooth height at the end of a requested tooth pattern is greater than the tooth height at the beginning of a subsequent tooth pattern, each repeating tooth pattern having a length of about 6 inches.

10. A method of manufacturing a bandsaw blade comprising the steps of cutting a repeating tooth pattern, each tooth pattern having a plurality of cutting teeth, and setting selected ones of said teeth in each said tooth pattern, each set tooth in each said tooth pattern having a set greater than or equal to a set of a preceding set tooth in the tooth pattern, said set at the end of the tooth pattern being greater than the set at the beginning of the tooth pattern, said teeth being cut and set such that after setting, each tooth in each said tooth pattern has a height with respect to a back edge of said blade greater than a height of a preceding tooth in the tooth pattern, the height difference between a tooth at the beginning of the tooth pattern and a tooth at the end of the tooth pattern being between about ten and twenty-five thousandths of an inch, and tips of said teeth in each said tooth pattern lie in a plane which is inclined with respect to the back edge of said blade.

11. A method of manufacturing a bandsaw blade comprising the steps of cutting a repeating tooth pattern, each tooth pattern having a plurality of cutting teeth, and setting selected ones of said teeth in each said tooth pattern, each set tooth in each said tooth pattern having a set greater than or equal to a set of a preceding set tooth in the tooth pattern, said set at the end of the tooth pattern being greater than the set at the beginning of the tooth pattern, said teeth being cut and set such that after setting, each tooth in each said tooth pattern has a height with respect to a back edge of said blade greater than a height of a preceding tooth in the tooth pattern, the height difference between a tooth at the beginning of the tooth pattern and a tooth at the end of the tooth pattern being between about fifteen and twenty thousandths of an inch, and tips of said teeth in each said tooth pattern lie in a plane which is inclined with respect to the back edge of said blade.

* * * * *